US012677246B2

(12) United States Patent
Paltin et al.

(10) Patent No.: US 12,677,246 B2
(45) Date of Patent: Jul. 7, 2026

(54) ROUND TRIP TIME-BASED DIRECT POSITIONING OF USER EQUIPMENT

(71) Applicant: Dell Products L.P., Round Rock, TX (US)

(72) Inventors: Evgeny Paltin, Montreal (CA); Gwenael Poitau, Montreal (CA); Hamidreza Farmanbar, Ottawa (CA)

(73) Assignee: DELL PRODUCTS L.P., Round Rock, TX (US)

( * ) Notice: Subject to any disclaimer, the term of this patent is extended or adjusted under 35 U.S.C. 154(b) by 428 days.

(21) Appl. No.: 18/340,984

(22) Filed: Jun. 26, 2023

(65) Prior Publication Data

US 2024/0430849 A1 Dec. 26, 2024

(51) Int. Cl.
H04W 64/00 (2009.01)
H04L 43/0864 (2022.01)

(52) U.S. Cl.
CPC ....... H04W 64/003 (2013.01); H04L 43/0864 (2013.01)

(58) Field of Classification Search
CPC . H04W 64/003; H04W 64/00; H04W 64/006; H04W 4/029; H04W 4/023; H04W 4/02; H04W 4/024; H04W 4/33; H04W 4/06; H04W 4/80; H04W 16/18; H04W 72/542; H04L 43/0864; G01S 13/765; G01S 13/878; G01S 5/0273; G01S 5/0278; G01S 5/0236; G01S 5/0036; G01S 5/021; G01S 7/417; G01S 5/02524; G01S 5/0244; G01S 5/0027; G01S 5/0252; G01S 5/02521; G06N 3/08; G06N 20/00; G06N 3/09; G06N 3/045; G06N 3/0464; (Continued)

(56) References Cited

U.S. PATENT DOCUMENTS

| | | | | |
|---|---|---|---|---|
| 10,908,299 | B1 * | 2/2021 | Tadayon | ............... H04W 4/027 |
| 2010/0190509 | A1 * | 7/2010 | Davis | .................. H04W 56/006 |
| | | | | 455/456.1 |

(Continued)

OTHER PUBLICATIONS

3GPP, "5G; NG Radio Access Network (NG-RAN); Stage 2 functional specification of User Equipment (UE) positioning in NG-RAN (3GPP TS 38.305 version 15.4.0 Release 15)," ETSI TS 138 305 V15.4.0 (Jul. 2019).

(Continued)

*Primary Examiner* — Nimesh Patel
(74) *Attorney, Agent, or Firm* — Amin, Turocy & Watson, LLP

(57) ABSTRACT

The technology described herein is directed towards training an AI/ML (artificial intelligence/machine learning) model with round trip time data that captures various properties of a planned deployment of transmit-receive points. The model is trained on round-trip time measurements of communications between training device instances and transmit-receive points in an actual or simulated deployment environment. Once the model is trained, an unknown location of a user equipment in the deployment environment is determined by the trained model, by obtaining a vector dataset (acting as a 'fingerprint') of measured round trip times of communications between the user equipment and the transmit-receive points, and inputting the vector dataset to the trained model.

20 Claims, 10 Drawing Sheets

(58) Field of Classification Search
CPC ...... G06N 20/10; G06N 3/0475; G06N 3/047;
G06N 3/096; G06N 3/044; G06N 20/20;
G06N 3/094; G06N 3/088; G06N 3/091;
G06N 5/02; G06N 3/049; G06N 5/022;
G06N 3/02; G06T 2207/20081; G06T
2207/20084; G06T 5/60; G06T 3/4046;
G06F 18/214; G06F 18/22; G06F
18/2413; G06F 18/24; G06F 16/29; G06F
16/35; G06V 10/82; G06V 10/774; G06V
10/426; G06V 10/757; G06V 10/761;
G06V 30/19093
See application file for complete search history.

(56) References Cited

U.S. PATENT DOCUMENTS

| | | | |
|---|---|---|---|
| 2022/0070028 A1* | 3/2022 | Yerramalli | G06N 3/09 |
| 2023/0037704 A1 | 2/2023 | Hirzallah et al. | |
| 2023/0043111 A1* | 2/2023 | Zhuang | G01S 5/021 |
| 2024/0411009 A1* | 12/2024 | Zhang | G01S 5/0278 |
| 2024/0430849 A1* | 12/2024 | Paltin | H04L 43/0864 |
| 2024/0430850 A1* | 12/2024 | Paltin | H04L 43/0864 |

OTHER PUBLICATIONS

Invitation to Pay Additional Fees mailed May 10, 2024 for PCT Application No. PCT/US2023/036204, 9 pages.

Hashem Omar et al: "DeepNar: Robust Time-based Sub-meter Indoor Localization using Deep Learning", 2020 17th Annual IEEE International Conference on Sensing, Communication, and Networking (SECON), IEEE, Jun. 22, 2020, 9 pages.
International Search Report and Written Opinion mailed Sep. 9, 2024 for PCT Application No. PCT/US2023/036204, 21 pages.
Xingqin Lin et al: "AI and ML for positioning enhancement", Nvidia. 3GPP Draft; R1-2303440; Type Discussion; FS_NR_AIML_AIR, 3rd Generation Partnership Project (3GPP), Xingqin Lin et al: "AI and ML for positioning enhancement", 3GPP Draft; R1-2303440; Type Discussion; FS_NR_AIML_AIR, 3rd Generation Partnership Project (3GPP), Apr. 2023, [https://www.3gpp.org/ftp/TSG_RAN/WG1_R LI/TSGR1_112b-e/Docs/RI-2303440.zip RI-2303440 AI and ML for positioning enhancement. docx ] 8 pages.
Moderator (Vivo): "FL summary #4 of other aspects on AI/ML for positioning accuracy enhancement", 3GPP Draft; R1-2306180, 3rd Generation Partnership Project (3GPP}, vol. RAN WGI, No. Incheon, Korea; May 2023, [https://ftp.3gpp.org/Meetings_3GPP_SYN C/RANI/Inbox/RI-2306180.zip RI-2306180Summary-4-AI9.2.4.2_v036_Moderator.docx] 112 pages.
International Preliminary Report on Patentability received for PCT Application Serial No. PCT/US2023/036204 dated Jan. 8, 2026, 12 pages.
Communication pursuant to Rules 161(1) and 162 EPC received for European Patent Application Serial No. 23813930.7 dated Feb. 3, 2026, 3 pages.

* cited by examiner

100

108

104(1)

TRP 1

RTT 1

106

110

104(2)

TRP 2          RTT 2

RTT Vector Dataset

112

Location Management Function

Trained AI / ML Model          114

102

UE at Location ?

104(3)

RTT 3

TRP 3

UE Location Coordinates          116

RTT N

104(N)

TRP N

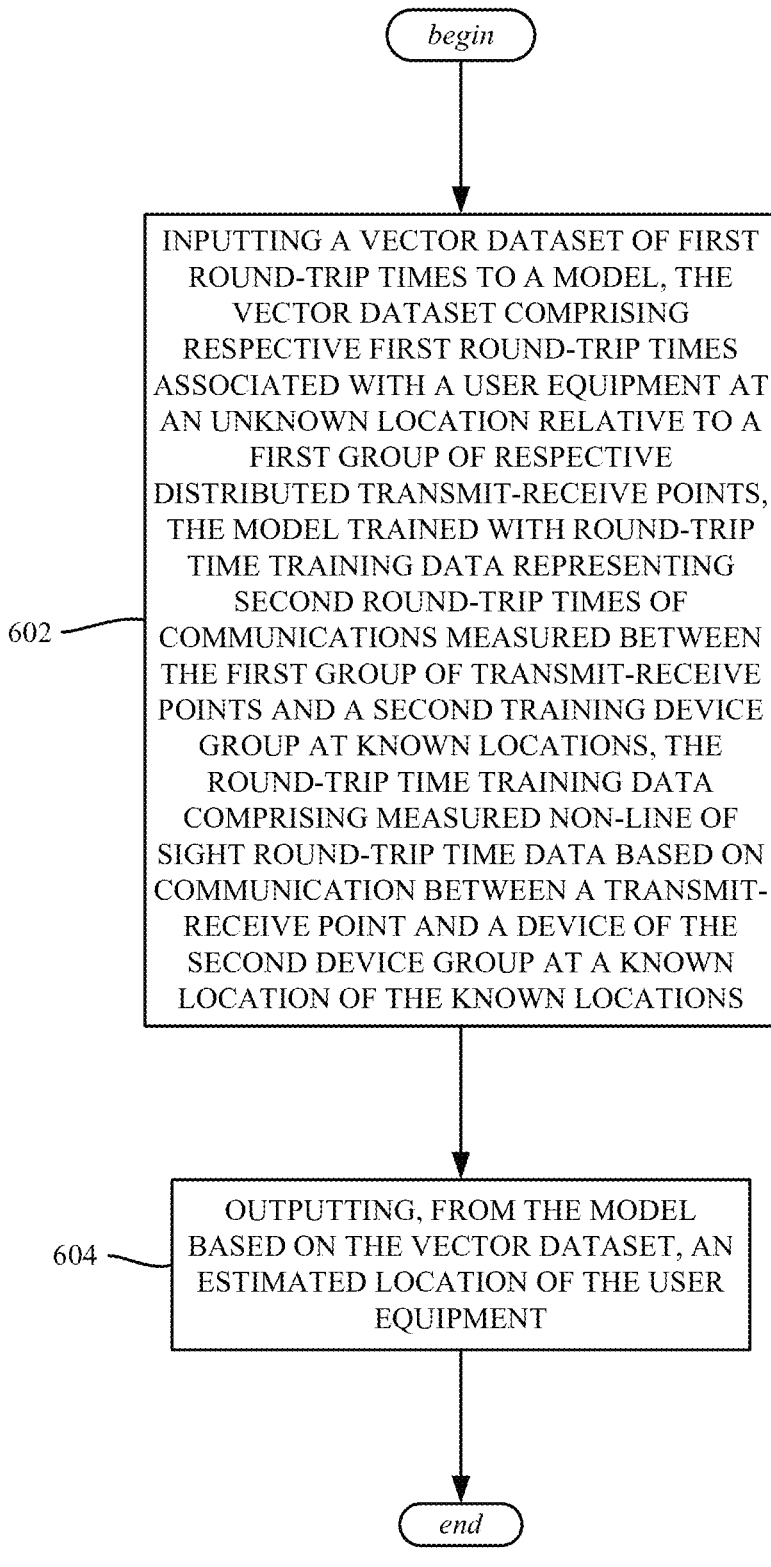

begin

602 — INPUTTING A VECTOR DATASET OF FIRST
ROUND-TRIP TIMES TO A MODEL, THE
VECTOR DATASET COMPRISING
RESPECTIVE FIRST ROUND-TRIP TIMES
ASSOCIATED WITH A USER EQUIPMENT AT
AN UNKNOWN LOCATION RELATIVE TO A
FIRST GROUP OF RESPECTIVE
DISTRIBUTED TRANSMIT-RECEIVE POINTS,
THE MODEL TRAINED WITH ROUND-TRIP
TIME TRAINING DATA REPRESENTING
SECOND ROUND-TRIP TIMES OF
COMMUNICATIONS MEASURED BETWEEN
THE FIRST GROUP OF TRANSMIT-RECEIVE
POINTS AND A SECOND TRAINING DEVICE
GROUP AT KNOWN LOCATIONS, THE
ROUND-TRIP TIME TRAINING DATA
COMPRISING MEASURED NON-LINE OF
SIGHT ROUND-TRIP TIME DATA BASED ON
COMMUNICATION BETWEEN A TRANSMIT-
RECEIVE POINT AND A DEVICE OF THE
SECOND DEVICE GROUP AT A KNOWN
LOCATION OF THE KNOWN LOCATIONS

604 — OUTPUTTING, FROM THE MODEL
BASED ON THE VECTOR DATASET, AN
ESTIMATED LOCATION OF THE USER
EQUIPMENT end

FIG. 6

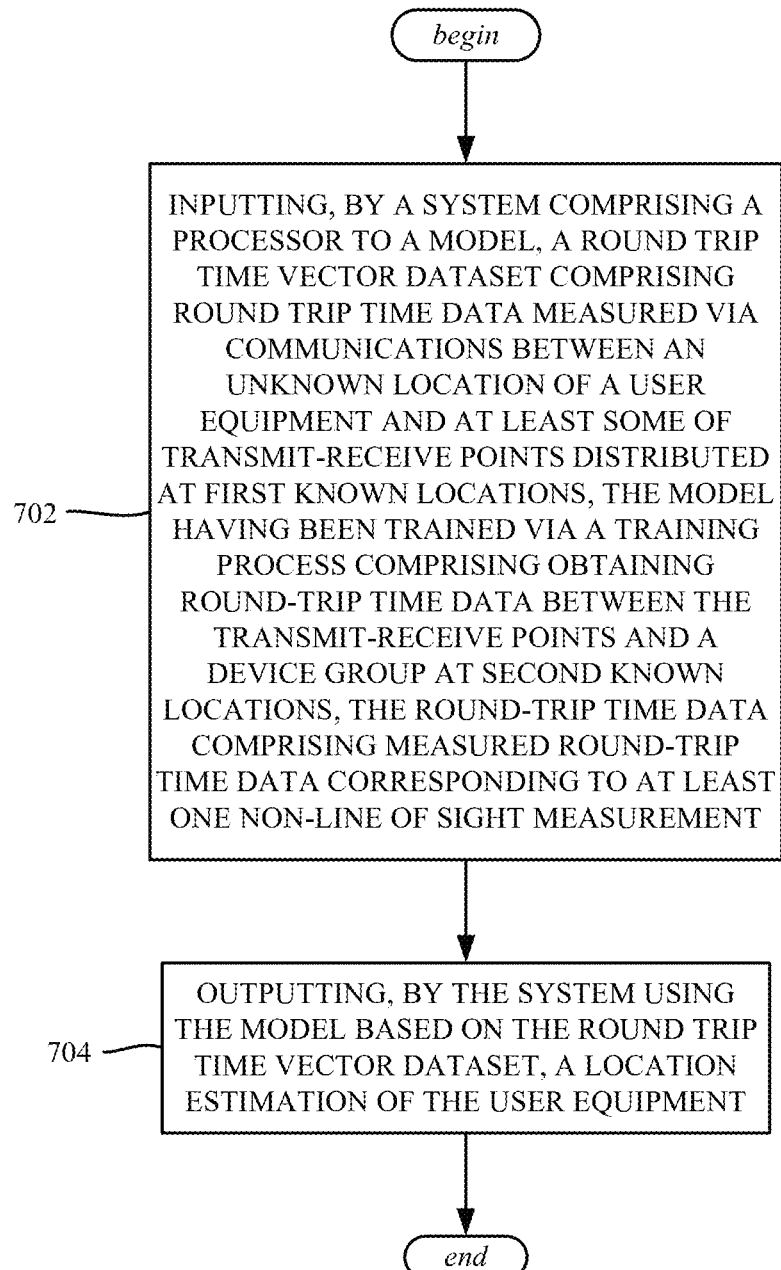

begin

702 — INPUTTING, BY A SYSTEM COMPRISING A PROCESSOR TO A MODEL, A ROUND TRIP TIME VECTOR DATASET COMPRISING ROUND TRIP TIME DATA MEASURED VIA COMMUNICATIONS BETWEEN AN UNKNOWN LOCATION OF A USER EQUIPMENT AND AT LEAST SOME OF TRANSMIT-RECEIVE POINTS DISTRIBUTED AT FIRST KNOWN LOCATIONS, THE MODEL HAVING BEEN TRAINED VIA A TRAINING PROCESS COMPRISING OBTAINING ROUND-TRIP TIME DATA BETWEEN THE TRANSMIT-RECEIVE POINTS AND A DEVICE GROUP AT SECOND KNOWN LOCATIONS, THE ROUND-TRIP TIME DATA COMPRISING MEASURED ROUND-TRIP TIME DATA CORRESPONDING TO AT LEAST ONE NON-LINE OF SIGHT MEASUREMENT

704 — OUTPUTTING, BY THE SYSTEM USING THE MODEL BASED ON THE ROUND TRIP TIME VECTOR DATASET, A LOCATION ESTIMATION OF THE USER EQUIPMENT end

FIG. 7

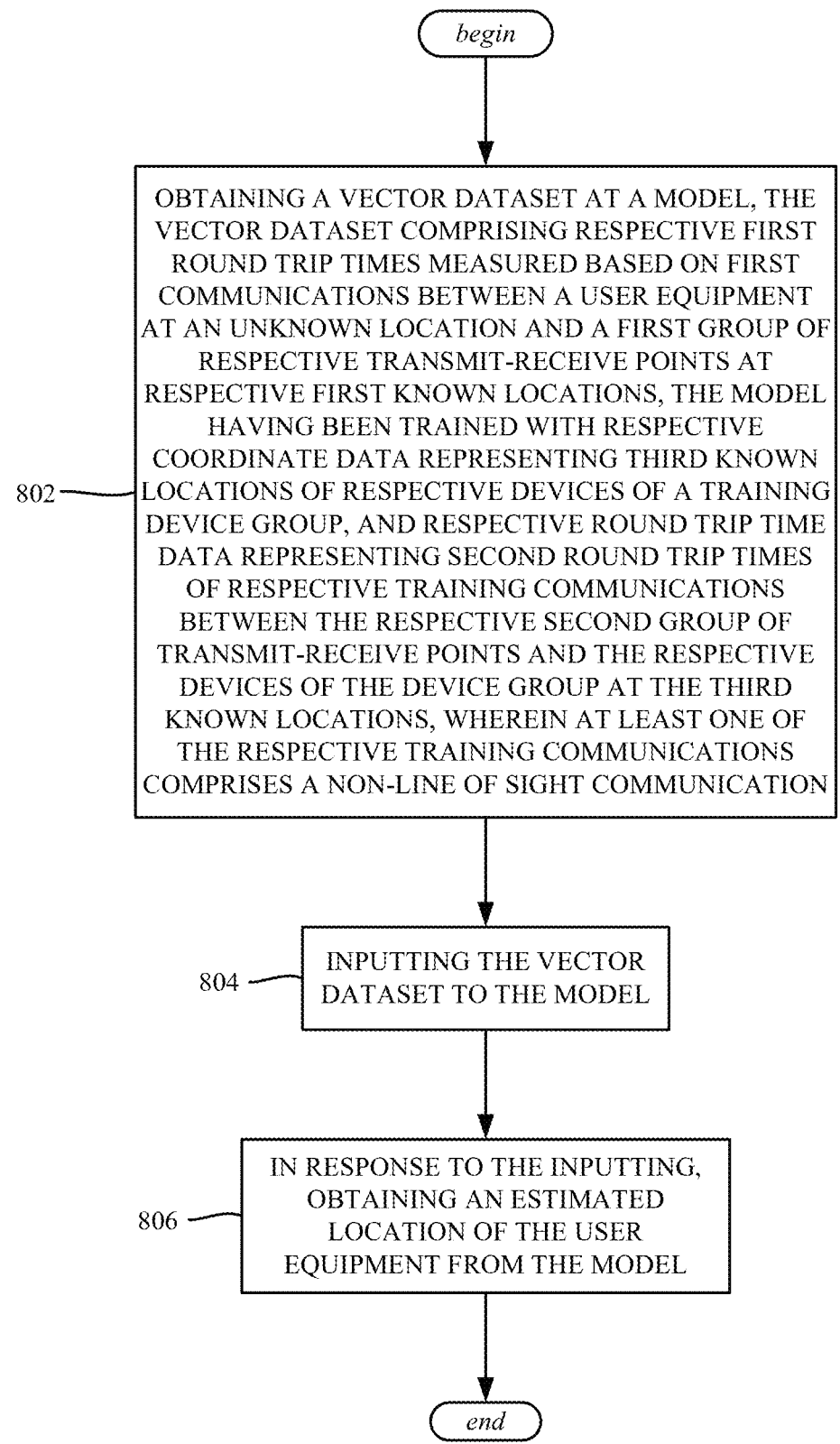

begin

802 —— OBTAINING A VECTOR DATASET AT A MODEL, THE VECTOR DATASET COMPRISING RESPECTIVE FIRST ROUND TRIP TIMES MEASURED BASED ON FIRST COMMUNICATIONS BETWEEN A USER EQUIPMENT AT AN UNKNOWN LOCATION AND A FIRST GROUP OF RESPECTIVE TRANSMIT-RECEIVE POINTS AT RESPECTIVE FIRST KNOWN LOCATIONS, THE MODEL HAVING BEEN TRAINED WITH RESPECTIVE COORDINATE DATA REPRESENTING THIRD KNOWN LOCATIONS OF RESPECTIVE DEVICES OF A TRAINING DEVICE GROUP, AND RESPECTIVE ROUND TRIP TIME DATA REPRESENTING SECOND ROUND TRIP TIMES OF RESPECTIVE TRAINING COMMUNICATIONS BETWEEN THE RESPECTIVE SECOND GROUP OF TRANSMIT-RECEIVE POINTS AND THE RESPECTIVE DEVICES OF THE DEVICE GROUP AT THE THIRD KNOWN LOCATIONS, WHEREIN AT LEAST ONE OF THE RESPECTIVE TRAINING COMMUNICATIONS COMPRISES A NON-LINE OF SIGHT COMMUNICATION

804 —— INPUTTING THE VECTOR DATASET TO THE MODEL

806 —— IN RESPONSE TO THE INPUTTING, OBTAINING AN ESTIMATED LOCATION OF THE USER EQUIPMENT FROM THE MODEL end

FIG. 8

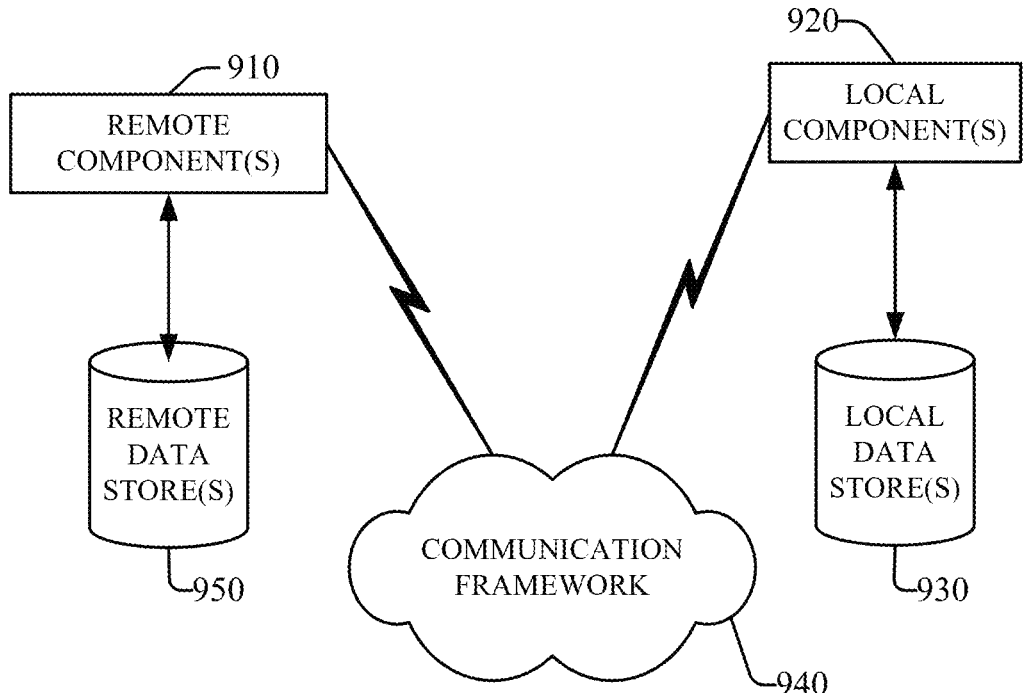
FIG. 9

ROUND TRIP TIME-BASED DIRECT POSITIONING OF USER EQUIPMENT

BACKGROUND

In new radio (NR), the third generation partnership project (3GPP) standard facilitates the collection of measurements needed to implement a multiple point round trip time positioning algorithm to determine the location of a user equipment (UE). This algorithm has a significant drawback, mainly because of its reliance on line-of-sight conditions between multiple transmit-receive points and a user equipment (UE). Even when most of the links between the transmit-receive points and a UE are line-of-sight links, even a single non-line of sight link can cause outsized degradation of the position determination.

Another approach to determining a UE's position is a channel impulse response (CIR)-based direct AI/ML (artificial intelligence/machine learning) approach, which avoids the line-of-sight dependency by having an AI/ML model find a relationship between CIR data and a position coordinate; (this approach is called 'Direct' because it maps directly between the CIR and location coordinates without trying to model the process). However, the CIR-based direct AI/ML approach is very impractical in most scenarios because of being sensitive to the slightest variations manifested in the perceived CIR. More particularly, one of the most significant CIR-related variations is a clock instability, which can correspond to loose timing synchronization between transmit-receive points. When a clock drifts, the perceived time of arrival is incorrect and channel taps phase rotate, resulting in incorrect CIR data. CIR-based direct AI/ML algorithms thus require very tight network synchronization. One solution attempts to include virtually all of the targeted conditions in the training dataset; for clock-related issues, this means attempting to generate a training dataset with virtually all possible variations of clock behaviors among multiple transmit-receive points and a UE. Such a solution is not practical for real system deployments.

BRIEF DESCRIPTION OF THE DRAWINGS

The technology described herein is illustrated by way of example and not limited in the accompanying figures in which like reference numerals indicate similar elements and in which:

FIG. 6 is a flow diagram showing example operations related to inputting a vector dataset of round-trip times to a trained model for outputting an estimated location of user equipment, in accordance with various aspects and implementations of the subject disclosure.

FIG. 7 is a flow diagram showing example operations related to obtaining a vector dataset of round-trip times measured via communications between an unknown location of a user equipment and transmit-receive points distributed at deployed locations, and inputting the vector dataset to a trained model for outputting an estimated location of user equipment, in accordance with various aspects and implementations of the subject disclosure.

FIG. 8 is a flow diagram showing example operations related to inputting a vector dataset of round-trip time data, measured via user equipment-transmit receive points' communications, to a model trained with other vector datasets for outputting an estimated location of the user equipment, in accordance with various aspects and implementations of the subject disclosure.

FIG. 9 is a block diagram representing an example computing environment into which aspects of the subject matter described herein may be incorporated.

DETAILED DESCRIPTION

Figure 1:
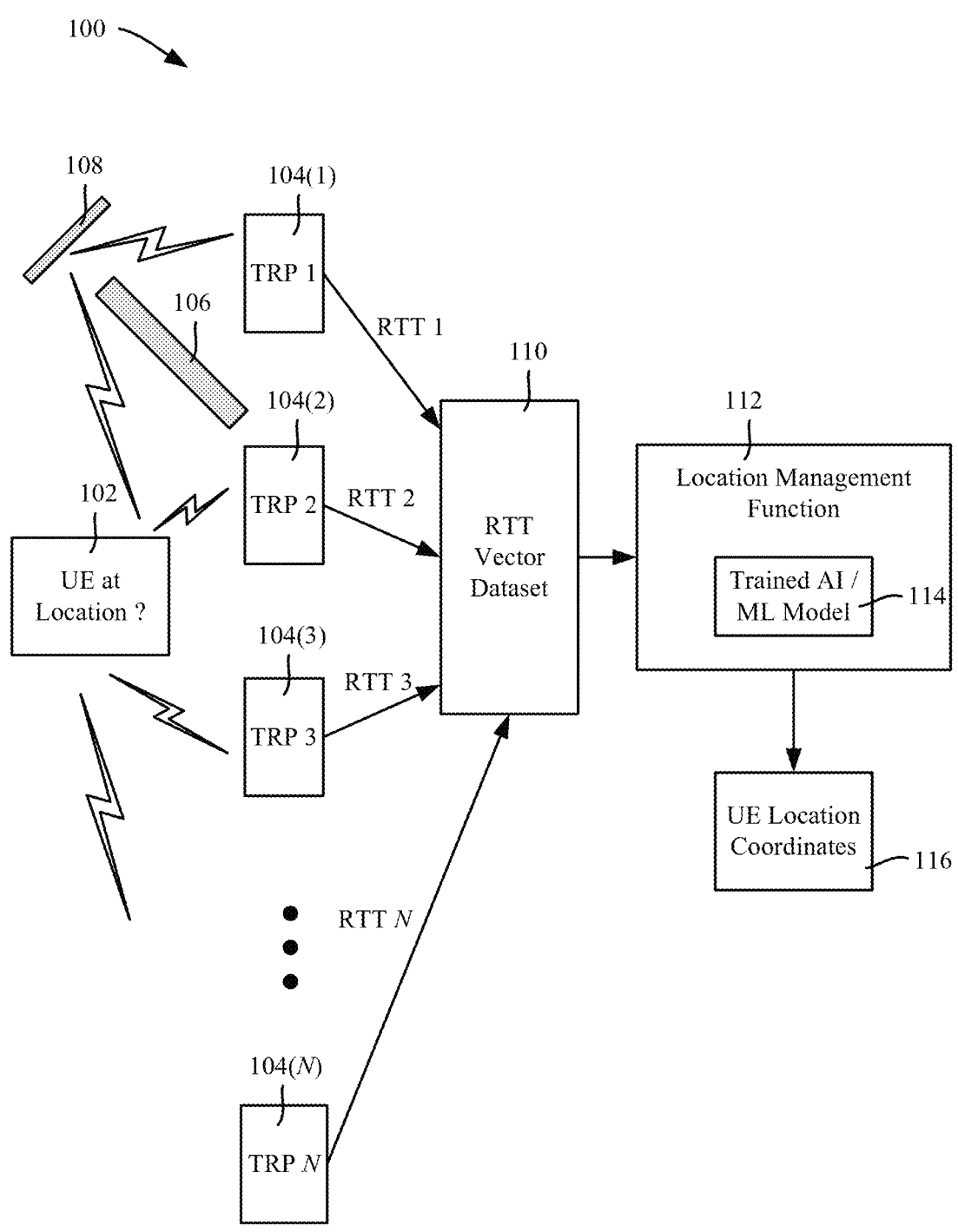
FIG. 1 depicts an example block diagram representation of a system/architecture in which an artificial intelligence/machine learning model inputs round trip time data, including for line of sight and non-line of sight communications, to estimate a location of a user equipment, in accordance with various aspects and implementations of the subject disclosure.

Various aspects of the technology described herein are generally directed towards having a trained artificial intelligence/machine learning (AI/ML) model map a dataset of round-trip time values, measured between transmit-receive points and user equipment at an unknown location, to an estimated location of the user equipment (e.g., as location coordinates $[x, y]$ or $[x, y, z]$). Significantly, the model can be trained for combinations of line of sight and non-line of sight communication links, and is intended to be trained on measured round trip time data instead of channel impulse response data.

In this way, for user equipment at an unknown location, the round-trip time values can be associated with both line of sight and non-line of sight communication links between the user equipment and a group of transmit-receive points. A vector dataset of these values can be input into the model to obtain an estimated location of the user equipment. In general, the vector dataset of round-trip time values represents a 'fingerprint' of the user equipment position that incorporates an environment's deployment-specific properties, e.g., including any obstacles between some of the transmit-receive points and the user equipment and/or properties of signal-reflecting surfaces.

Training is based on labeled training data corresponding to communications between a group of transmit-receive points and a number of device training instances (e.g., a device group) at known locations, with measured round trip time data obtained via the communications between the transmit-receive points and the device training instances. That is, each training label for each transmit-receive point can include a training device instance location (e.g., training device coordinates) and the round trip time taken for communications to and from the device training instance location and the transmit-receive point.

As is understood, the round trip time for a non-line of sight communication is longer than the round trip time a line of sight communication. However, because each training device instance location is known, for non-line of sight communication links the model learns, e.g., based on the time difference between a measured round trip time and what the expected round trip time is determined to be had there been a line of sight communication link.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 is an example representation of a system/architecture 100 in which user equipment 102 at an unknown location communicates with a number of transmit-receive points (TRPs) 104(1)-104(N) deployed in an environment. This results in a number of round trip times RTT1-RTTN being determined by the transmit-receive points 104(1)-104 (N), as further described in FIG. 2. As can be seen, at least RTT1 does not correspond to a line of sight measurement, as any direct communication link between the user equipment 102 and the transmit-receive points 104(1) (TRP 1) is blocked by an obstacle 106; whereby the measurement communication link is indirect, obtained as non-line of sight data off of some reflective surface 108. There may be any practical number of line of sight and non-line of sight round trip times in a given deployment.

In general, the transmit-receive points 104(1)-104(N) along with their multiple respective measured round trip times are combined into a round trip time (RTT) vector dataset 110. As set forth therein, these multiple locations and corresponding times act as a 'fingerprint' that a location management function 112, which in this implementation is an AI/ML model 114, is trained to process into an estimated location (e.g., UE coordinates 116) of the user equipment 102. As can be readily appreciated, the amount of training data along with the fidelity of the training data (e.g., how accurate are the training devices' locations and measured round trip times) determine how closely the UE's estimated location coordinates are to the UE's actual location.

Figure 2:
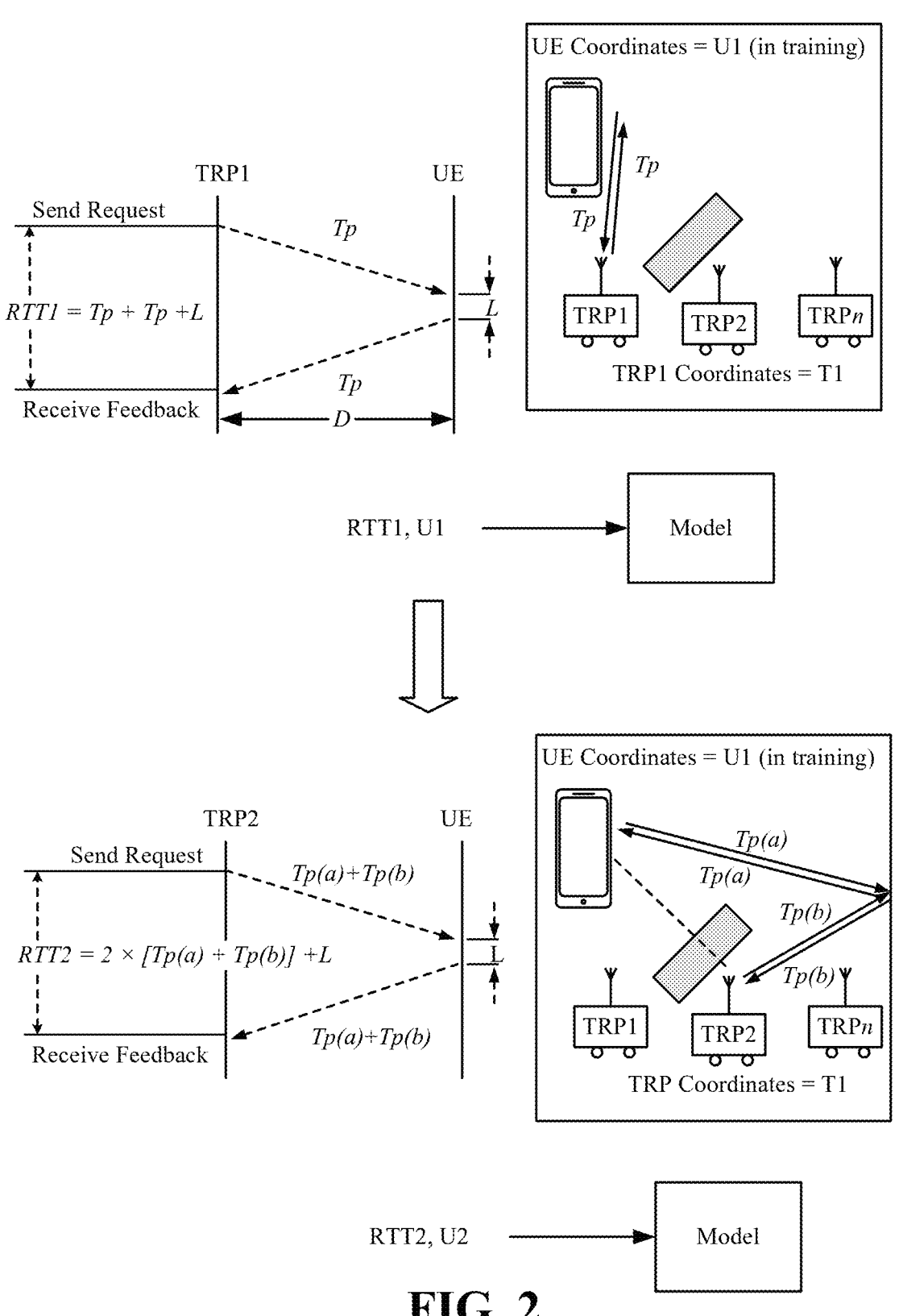
FIG. 2 shows example representations of round trip time data for line of sight and non-line of sight communication links, in accordance with various aspects and implementations of the subject disclosure.

FIG. 2 shows the concept of round trip times for line of sight communication links and non-line of sight communication links. For a line of sight communication link, as shown in the upper portion of FIG. 2, a transmit receive point (TRP) sends a request to a user equipment (UE), which is received and responded to by the UE by a transmission back to the TRP. The propagation time $T_p$ taken to transmit from the TRP1 and receive at the UE, and vice versa is based on the distance D, that is, $D=T_p \cdot c$, where c is the speed of light. There is some latency, L, at the UE between reception and the return transmission, and thus RTT1=Tp+Tp+L based on $T_p=(RTT-L)/2$. Timestamps or the like associated with each transmission can be used to determine the latency. In training, the coordinates U1 of each UE device instance (which can be a positioning reference unit such as described in the third generation partnership, or 3GPP standards) are known and used in the training data, along with the RTT1 value. During inference after training, the UE coordinates are unknown, and thus the RTT1 value associated with the TRP1 is part of the round trip time vector dataset/fingerprint used to estimate the UE coordinates.

The lower portion of FIG. 2 shows the concept of a round trip time for a non-line of sight communication link. In this example, the transmit-receive point (TRP2) sends a request to the user equipment (UE), which is received and responded to by the UE by a transmission back to the TRP2. Each total propagation time taken to transmit from the TRP1 and receive at the UE, and vice versa is based on the indirect links, shown as propagation times $T_p(a)$ and $T_p(b)$. Again, there is some latency, L, taken by at the UE between reception and the return transmission, and thus RTT2=2× $[T_p(a)+T_p(b)]+L$. In training, the UE's coordinates U1 are known and used in the training data along with the RTT2 value and the TRP2 coordinates T2; in inference, the UE coordinates are unknown, and thus the RTT2 value associated with the TRP2 is part of the round trip time vector dataset/fingerprint used to estimate the UE coordinates.

Figure 3:
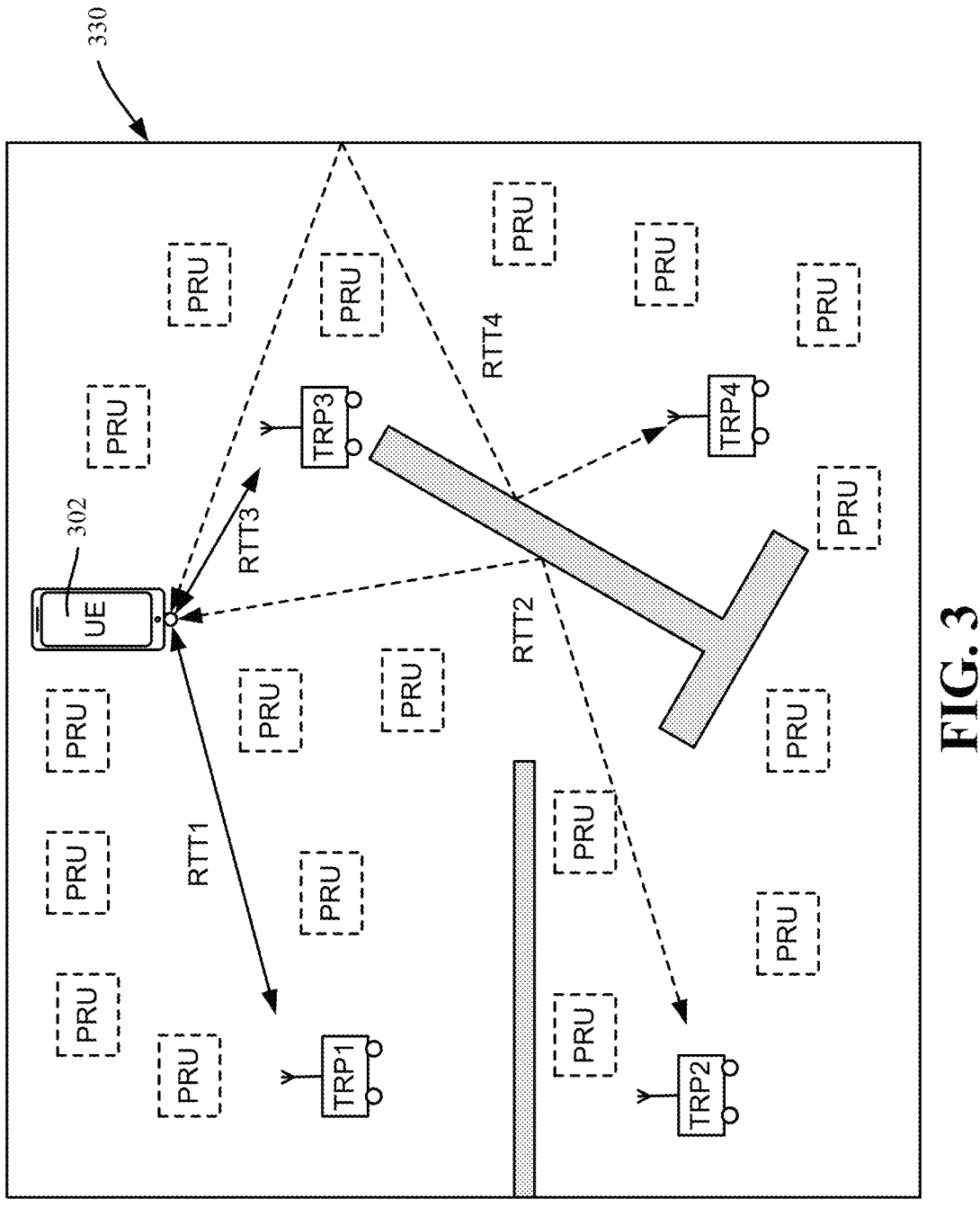
FIG. 3 is an example representation of a deployment area with round trip time model training data obtained from positioning reference unit (PRU) device instances and transmit-receive points (TRPs), and thereafter how a user equipment location can be estimated by a model that has been trained with the training data, in accordance with various aspects and implementations of the subject disclosure.

FIG. 3 shows a deployment environment 330 example of four transmit-receive points (TRP1-TRP4) that depict the AI/ML model training and/or model usage. As is understood, in training positioning reference unit device instances (PRUs, represented in FIG. 3 as dashed blocks) can be positioned and/or moved throughout a deployment environment, such as a factory setting, to gather PRU location, round trip time datasets from various PRU locations relative to the TRPs. Training other than with PRUs are alternatives, as described herein. The model, not explicitly shown in the example of FIG. 3, can be located outside of or within the environment 330, and in any event is trained with such collected datasets. Note that existing deployments can be upgraded without introducing modifications to TRPs, which is valuable because their number can be significant (eighteen in one 3GPP positioning scenario). In usage following training, the one or more PRUs need not be active and thus typically are not present, although their presence or absence is not significant unless retraining or refinement is needed.

In this example, consider that a realistic factory floor is moderately occupied with robots, shelves and other user equipment resulting in a various levels of propagation conditions, from line of sight to non-line of sight situations. With existing line of sight-dependent algorithms, positioning accuracy of the implementation is not consistent, due to 'pockets' of non-line of sight conditions spread across the factory.

Consider that in this example, following training, a UE 302 such as a mobile internet of things (IoT) sensor or the like is within the deployment environment 330, and is located at an unknown location that needs to be determined, particularly if the UE 302 moves from time to time whereby physical measurement for this device (and likely many such devices) is not practical. In this example, as can be seen, RTT1 and RTT3 will be obtained based on line of sight communication links, while RTT2 and RTT4 will be obtained based on non-line of sight communication links. The solid lines represent the line of sight (direct) communication links between the transmit receive points TRP1 and TRP3 to and from the UE 302, while the dashed lines represent the non-line of sight (indirect) communication links between the transmit receive points TRP2 and TRP4 to and from the UE 302.

In FIG. 3, the non-line of sight propagation distances are significantly longer than the line of sight links, corresponding to longer round trip times RTT2 and RTT4 for the non-line of sight communication links relative to the shorter round trip times RTT1 and RTT3. However, because the model was trained on both line of sight and non-line of sight propagation distances corresponding to round trip times, a sufficiently accurate location of the UE can be estimated by the model. Note that existing multi-RTT (at least three points for triangulation with two dimensions, four points with three dimensions) algorithms that rely solely on line of sight will be given two skewed RTT measurements (RTT2 and RTT4), whereby if used, the position estimation would suffer significantly. Instead, the system described herein replaces the trilateration (or multi-lateration) positioning algorithm with an RTT-based direct AI/ML model (in the location management function 112, FIG. 1), in which the model uses the RTT 'fingerprints' of the deployment, including RTT measurements from the TRPs regardless of the communications links' line of sight or non-line of sight conditions.

Different AI/ML regression solutions can be considered depending on system requirements and platform capabilities. Models can include, but are not limited to classical tools such as polynomial regression models, as well as deep neural network (DNN) models. In the event the environment changes, reinforcement learning can be employed to maintain a model's relevance over time.

The AI/ML model captures unique properties of a planned deployment, meaning the model is trained on real measurements in the deployment environment as in FIG. 3, or based on a high-fidelity simulation of the environment. To this end, a training dataset (vectors of RTT measurements) can be generated using one or a combination of the following techniques, including using positioning reference units (PRUs)/instances thereof spread in the deployment area at known locations to collect round trip time measurements of communications between the PRUs and the transmit-receive points. A PRU acts as a UE with a benefit of a known location, enabling to link measurements to a label. The PRUs-based dataset spatial resolution can be refined further by employing semi-supervised learning.

In outdoor scenarios, instead of (or in addition to) PRUs, one or more training device instances in the form of UEs with GPS reporting can be used, potentially enabling to collect more detailed datasets from various locations in the outdoor environment. Digital twin simulations can be used for training, where a digital twin refers to a realistic simulation of a targeted space/area, which in addition to geometric properties also simulates true-to-reality physics of materials, resulting in close-to-realistic behavior.

Figure 4:
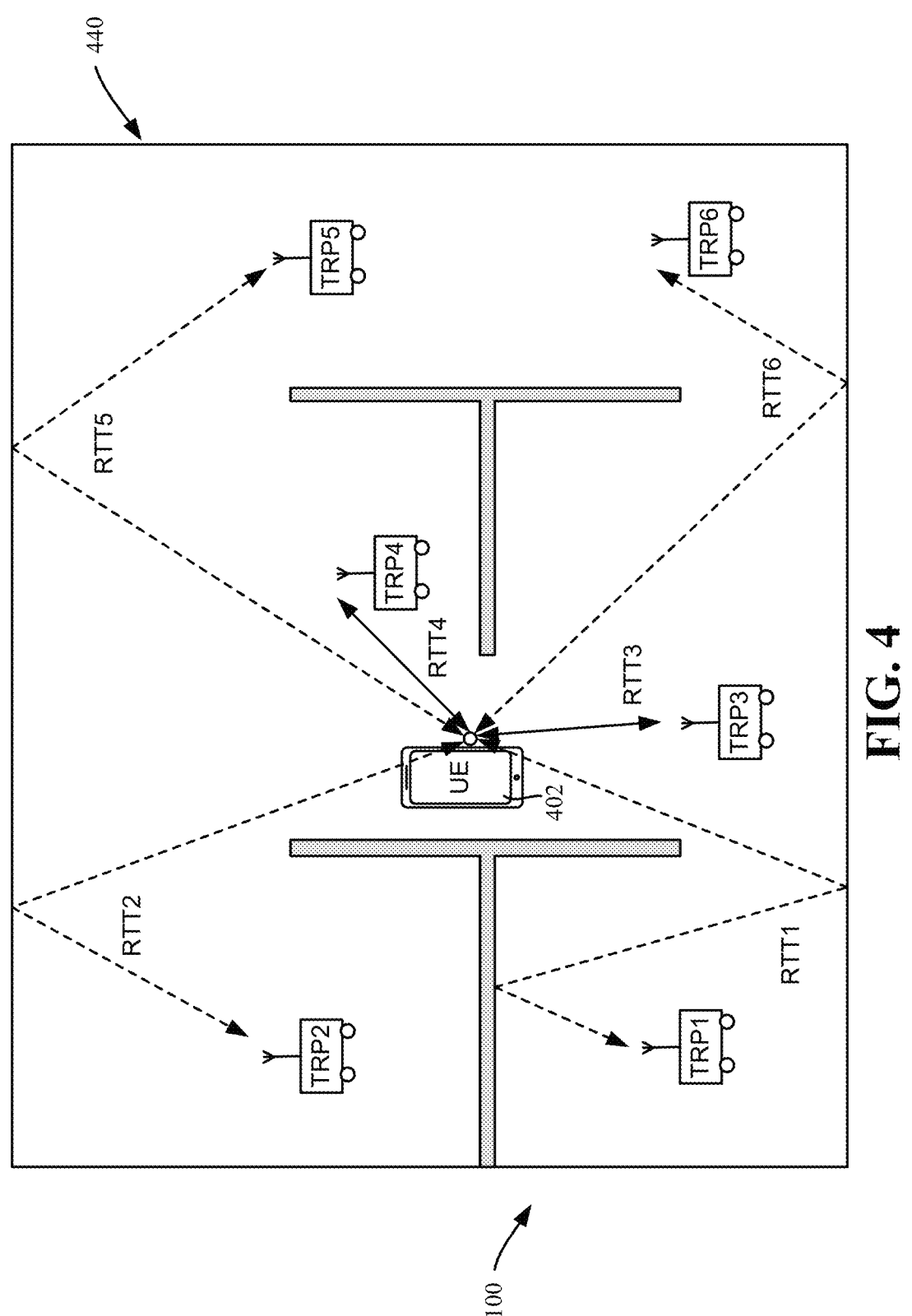
FIG. 4 is an example representation of a deployment area in which a user equipment's location can be estimated by a trained model based on round trip time data of measured communications between transmit-receive points and the user equipment, in accordance with various aspects and implementations of the subject disclosure.

In another example shown in FIG. 4, six transmit-receive points (TRP1-TRP6) depict AI/ML model usage with respect to estimating the location of a user equipment 402. Although not explicitly shown, it is understood that training has already occurred similar to that described with reference to FIG. 3, e.g., via a number of training devices at various locations in the environment 440. As can be seen, again the non-line of sight propagation distances are significantly longer than the line of sight links, corresponding to longer round trip times RTT1. RTT2, RTT5 and RTT6 for the non-line of sight communication links relative to the shorter round trip times RTT3 and RTT4. However, because the model was trained on both line of sight and non-line of sight propagation distances/round trip times, a sufficiently accurate location of the UE 402 can be estimated by the model.

Figure 5:
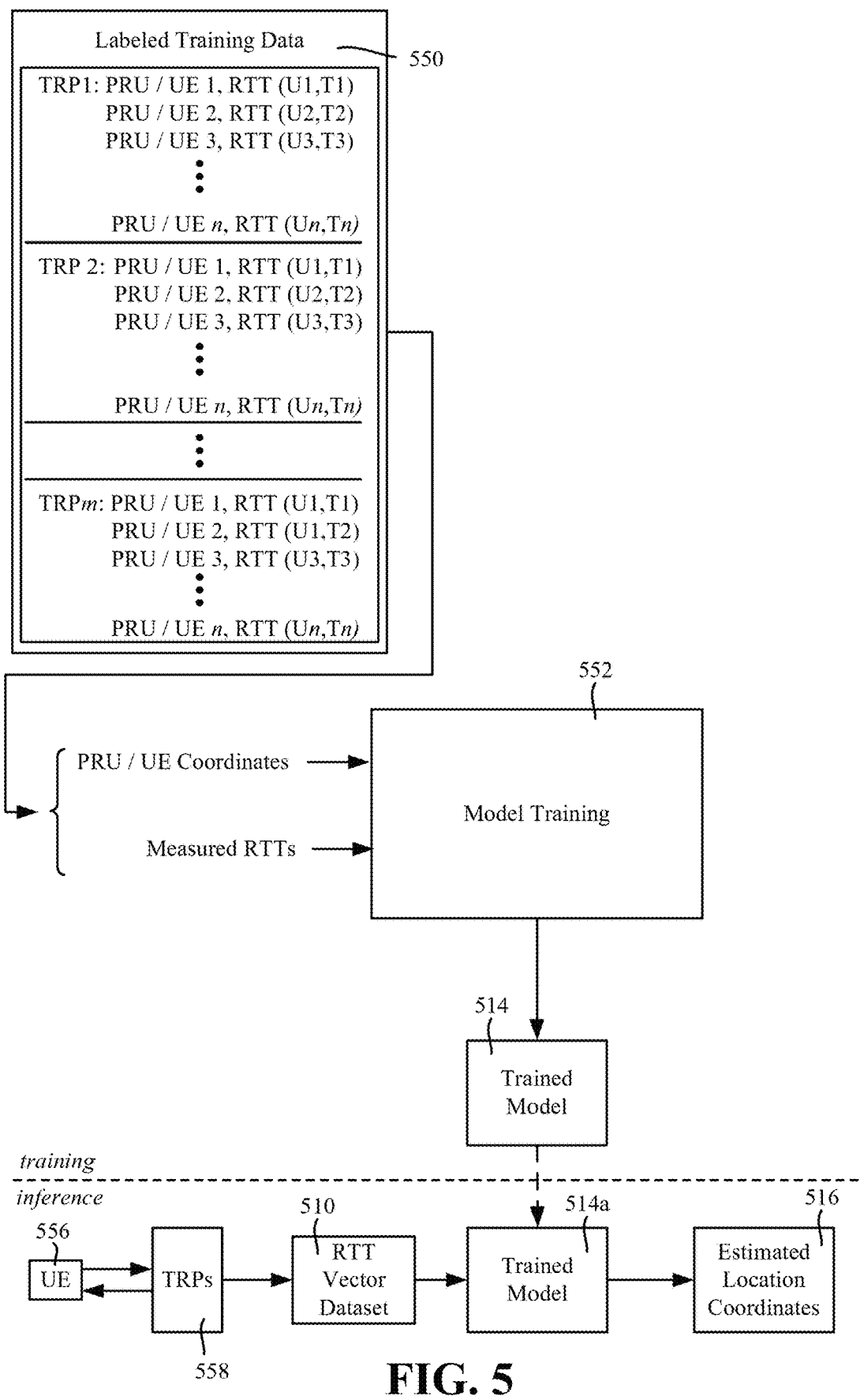
FIG. 5 is an example block diagram representation related to training a model with PRU (or UE) location data and associated measured round trip time data, and then using the trained model based on measured round trip time data to estimate a location of user equipment, in accordance with various aspects and implementations of the subject disclosure.

Although not explicitly shown in FIGS. 2-4, it is understood that training can be performed by any number of training device instances, which can be a single training device (e.g., UE) moved among multiple known locations, and/or multiple devices at multiple known locations. FIG. 5 shows a training-related example, in which training device instances, which can be one or more positioning reference units (PRUs) and/or UEs, are located at coordinates U1-Um, and transmit-receive points T1-Tn. Round trip time data is collected from each device coordinate and TRP combination, and these data are used as the labeled training data 550 to a model training process 552, resulting in a trained model 514. The collected RTT values are a function of TRP positions, UE positions and the environment (e.g., obstacles and reflective surfaces).

In inference, a UE 556 communicates with TRPs 558 to measure round trip time data, and the TRPs 558 in turn generate the round trip time (RTT) vector dataset 510. The RTT vector dataset 510, which includes RTT values for the TRPs, is input into a working instance 514a of the trained model, resulting in estimated location coordinates 516 of the UE 556.

One or more aspects can be embodied in a system, such as represented in the example operations of FIG. 6, and for example can include a memory that stores computer executable components and/or operations, and a processor that executes computer executable components and/or operations stored in the memory. Example operations can include operation 602, which represents inputting a vector dataset of first round-trip times to a model, the vector dataset comprising respective first round-trip times associated with a user equipment at an unknown location relative to a first group of respective distributed transmit-receive points, the model trained with round-trip time training data representing second round-trip times of communications measured between the first group of transmit-receive points and a second training device group at known locations, the round-trip time training data comprising measured non-line of sight round-trip time data based on communication between a transmit-receive point and a device of the second device group at a known location of the known locations. Example operation 604 represents outputting, from the model based on the vector dataset, an estimated location of the user equipment.

The transmit-receive point can be a first transmit-receive point, and the round-trip time training data further can include line of sight data between a second transmit-receive point and the device of the second training device group at the second known location.

The second training device group can include positioning reference units deployed at the second known locations.

The second training device group can include at least one mobile device configured to report the second known locations via global positioning system data.

The first group of transmit-receive points and the second device group at the known locations are represented by a digital twin simulation of an environment, and wherein the round-trip time training data is based on the digital twin simulation.

The transmit-receive points can be spatially distributed in a deployment environment.

The transmit-receive points can be substantially evenly distributed.

Further operations can include refining spatial resolution of the transmit-receive points via semi-supervised learning.

The model can include a polynomial regression model.

The model can include a deep neural network.

Further operations can include updating the model via reinforcement learning.

The second training device group can include a mobile device moved among the second known locations.

One or more example aspects, such as corresponding to example operations of a method, are represented in FIG. 7. Example operation 702 represents inputting, by a system comprising a processor to a model, a round trip time vector dataset comprising round trip time data measured via communications between an unknown location of a user equipment and at least some of transmit-receive points distributed at first known locations, the model having been trained via a training process comprising obtaining round-trip time data between the transmit-receive points and a device group at second known locations, the round-trip time data comprising measured round-trip time data corresponding to at least one non-line of sight measurement. Example operation 704 represents outputting, by the system using the model based on the round trip time vector dataset, a location estimation of the user equipment.

The training process further can include arranging non-line of sight transmit-receive points between a device of the device group and the non-line of sight transmit-receive points more densely than line of sight transmit-receive points between the device of the device group and the line of sight transmit-receive points.

The training process further can include moving at least one positioning reference unit among the second known locations.

The training process further can include moving at least one mobile device among the second known locations, and wherein the at least one mobile device reports each location of the second known locations.

The training process further can include obtaining labeled training data comprising labeled respective second coordinate data representing the second known locations, and respective round trip time data of respective communications between respective transmit-receive points at the first known locations and respective devices of the device group at the second known locations.

FIG. 8 summarizes various example operations, e.g., corresponding to a machine-readable medium, comprising executable instructions that, when executed by a processor, facilitate performance of operations. Example operation 802 represents obtaining a vector dataset at a model, the vector dataset comprising respective first round trip times measured based on first communications between a user equipment at an unknown location and a first group of respective transmit-receive points at respective first known locations, the model having been trained with respective coordinate data representing third known locations of respective devices of a training device group, and respective round trip time data representing second round trip times of respective training communications between the respective second group of transmit-receive points and the respective devices of the device group at the third known locations, wherein at least one of the respective training communications can includes a non-line of sight communication. Example operation 804 represents inputting the vector dataset to the model. Example operation 806 represents in response to the inputting, obtaining an estimated location of the user equipment from the model.

The respective first known locations can include the respective second known locations.

The respective devices of the device training group at the third known locations can include at least one of: a positioning reference unit, or a mobile device.

As can be seen, the technology described herein exploits relations between measured RTT values, including with line of sight and non-line of sight conditions, to derive a UE's position using direct AI/ML positioning, yet without tight network synchronization requirements. That is, the technology described herein is based on a direct AI/ML approach without the drawbacks of channel impulse response timing considerations (input variations and tight network synchronization requirements, although channel impulse response is not precluded from use as well), and without the drawbacks of line of sight conditions/requirements of existing multi-RTT algorithms. No modification is needed for TRPs, which can be deployed at various practical locations.

An AI/ML model as described herein is less sensitive than existing direct AI/ML based approaches because of not being dependent on clock behavior, and can be trained and used with a reduced set of input data relative to channel impulse response data. In addition, although deployment-specific, the reduced training input dimensions (training device coordinates and round trip time data) make it far more feasible to train the AI/ML model over a large number of expected scenarios, including in noisy RTT measurements, than could be practically done using the vast number of possible variations that can impact perceived channel impulse response data. The AI/ML model as described herein thus has reduced complexity relative to channel impulse response-based model. Still further, in usage of the model, there is reduced overhead of reporting from the TRPs to the AI/M-based location management function, that is, only RTT measurements associated with the TRPs are part of the vector dataset, instead of the full channel impulse response data.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component (s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
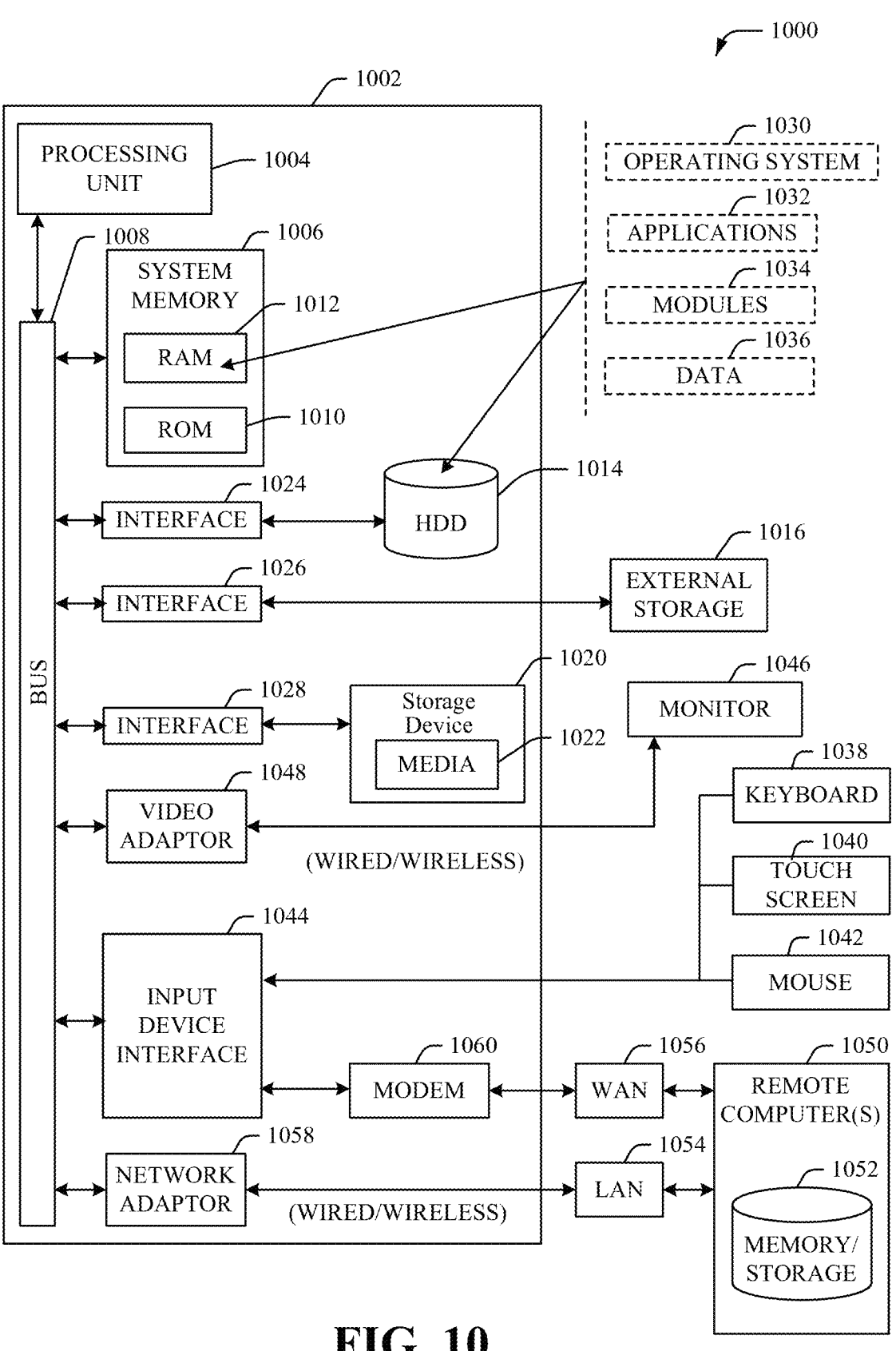
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

receiving a vector dataset that comprises respective first round-trip times associated with a user equipment at an unknown location relative to a group of respective distributed transmit-receive points;

determining, based on the respective first round-trip times, an estimated location of the user equipment using a trained location management machine learning model trained with round-trip time training data representing second round-trip times of communications measured between the group of respective distributed transmit-receive points and a training device group at known locations, the round-trip time training data comprising measured non-line of sight round-trip time data and measured line of sight round-trip data based on respective communications between at least one transmit-receive point of the group of respective distributed transmit-receive points and respective devices, of the training device group, at respective known locations of the known locations, wherein the determining comprises using the round-trip training data as a fingerprint for determining coordinates of the user equipment based on processing the respective first round-trip times associated with the user equipment at the unknown location into the estimated location based on the fingerprint; and outputting, from the trained location management machine learning model and based on the vector dataset, the estimated location of the user equipment.

2. The system of claim 1, wherein the transmit-receive point is a first transmit-receive point, wherein the known location is a first known location, and wherein the round-trip time training data further comprises line of sight data between a second transmit-receive point of the group of respective distributed transmit-receive points and at least one device of the respective devices, of the training device group, at a second known location of the known locations.

3. The system of claim 1, wherein the training device group comprises positioning reference units deployed at second known locations of the known locations.

4. The system of claim 1, wherein the training device group comprises at least one mobile device configured to report second known locations of the known locations via global positioning system data.

5. The system of claim 1, wherein the group of respective transmit-receive points and the training device group at the known locations are represented by a digital twin simulation of an environment, and wherein the round-trip time training data is based on the digital twin simulation.

6. The system of claim 1, wherein transmit-receive points of the group of respective transmit-receive points are spatially distributed in a deployment environment.

7. The system of claim 6, wherein the transmit-receive points are evenly distributed in the deployment environment.

8. The system of claim 6, wherein the operations further comprise refining spatial resolution of the transmit-receive points of the group of respective transmit-receive points via semi-supervised learning.

9. The system of claim 1, wherein the trained location management machine learning model comprises a polynomial regression model.

10. The system of claim 1, wherein the trained location management machine learning model comprises a deep neural network.

11. The system of claim 1, wherein the operations further comprise updating the trained location management machine learning model via reinforcement learning.

12. The system of claim 1, wherein the training device group comprises at least one mobile device moved among the second known locations of the known locations.

13. A method, comprising:

inputting, by a system comprising at least one processor to a trained location management machine learning model, a dataset that comprises round trip time vector data measured via communications between a user equipment at an unknown location and at least some of transmit-receive points distributed at first known locations, the trained location management machine learning model having been trained via a training process using training round-trip time data between the transmit-receive points and a device group at second known locations, the round-trip time vector data comprising measured non-line of sight round-trip times corresponding to non-line of sight measurements and measured line of sight round-trip times corresponding to non-line of sight measurements;

determining, by the trained location management machine learning model of the system, a location estimation of the user equipment, wherein the determining comprises using the training round-trip time data as a fingerprint for determining coordinates of the user equipment based on processing the dataset that comprises the round trip time vector data associated with the user equipment at the unknown location into the location estimation based on the fingerprint; and based on the determining, outputting, by the system in response to the inputting of the dataset, using the trained location management machine learning model based on the time vector dataset, the location estimation of the user equipment.

14. The method of claim 13, wherein the training process further comprises arranging non-line of sight transmit-receive points between a device of the device group and the non-line of sight transmit-receive points more densely than line of sight transmit-receive points between the device of the device group and the line of sight transmit-receive points.

15. The method of claim 13, wherein the training process further comprises moving at least one positioning reference unit among the second known locations.

16. The method of claim 13, wherein the training process further comprises moving at least one mobile device among the second known locations, and wherein the at least one mobile device reports each location of the second known locations.

17. The method of claim 13, wherein the training process further comprises obtaining labeled training data comprising labeled respective second coordinate data representing the second known locations, and respective round trip time data of respective communications between respective transmit-receive points at the first known locations and respective devices of the device group at the second known locations.

18. A non-transitory machine-readable medium, comprising executable instructions that, when executed by at least one processor, facilitate performance of operations, the operations comprising:

obtaining a vector dataset at a trained location management machine learning model, the vector dataset comprising respective first round trip times measured based on first communications between a user equipment at an unknown location and a first group of respective transmit-receive points at respective first known locations, the trained location management machine learning model having been trained with respective coordinate data representing third known locations of respective devices of a training device group, and respective round trip time data representing second round trip times of respective training communications between a respective second group of transmit-receive points and the respective devices of the training device group at the third known locations, wherein the respective training communications comprises a non-line of sight communication and a line of sight communication;

inputting the vector dataset to the trained location management machine learning model;

determining, via the trained location management machine learning model and based on the respective first round trip time, an estimated location of the user equipment, wherein the determining comprises using the respective coordinate data as a fingerprint for determining coordinates of the user equipment based on processing the respective first round-trip times associated with the user equipment at the unknown location based on the fingerprint; and in response to the determining, obtaining the estimated location of the user equipment from the trained location management machine learning model.

19. The non-transitory machine-readable medium of claim 18, wherein the respective first known locations comprise the respective second known locations.

20. The non-transitory machine-readable medium of claim 18, wherein the respective devices of the training device group at the third known locations comprise at least one of: a positioning reference unit, or a mobile device.

\* \* \* \* \*